(12) United States Patent
Cunningham

(10) Patent No.: US 7,377,527 B2
(45) Date of Patent: May 27, 2008

(54) PET JOGGER

(76) Inventor: Stacey Lee Cunningham, 35 Independence Way, Rockaway, NJ (US) 07866

( * ) Notice: Subject to any disclaimer, the term of this patent is extended or adjusted under 35 U.S.C. 154(b) by 0 days.

(21) Appl. No.: 11/882,352

(22) Filed: Aug. 1, 2007

(65) Prior Publication Data

US 2008/0042385 A1    Feb. 21, 2008

Related U.S. Application Data

(63) Continuation-in-part of application No. 11/027,537, filed on Dec. 30, 2004, now abandoned.

(51) Int. Cl.
*B62B 7/06* (2006.01)
(52) U.S. Cl. ............... 280/47.38; 280/47.34; 280/32.5; 280/47.19; 280/47.25; 280/639
(58) Field of Classification Search .......... 280/47.38, 280/47.34, 32.5, 47.19, 47.25, 47.35, 87.01, 280/639
See application file for complete search history.

(56) References Cited

U.S. PATENT DOCUMENTS

| | | | |
|---|---|---|---|
| 4,349,210 A * | 9/1982 | Rutt | 280/47.21 |
| 5,029,891 A | 7/1991 | Jacobs | |
| 5,669,624 A | 9/1997 | Eichhorn | |
| 6,607,200 B1 | 8/2003 | Bridges | |
| 6,722,689 B2 * | 4/2004 | Kreamer | 280/642 |
| 6,913,271 B2 * | 7/2005 | Gordon | 280/87.01 |
| 7,152,554 B2 * | 12/2006 | Crawford | 119/496 |
| 2004/0227330 A1 * | 11/2004 | Everett | 280/642 |

* cited by examiner

*Primary Examiner*—Christopher Ellis
*Assistant Examiner*—Cynthia F Collado
(74) *Attorney, Agent, or Firm*—Thomas J. Germinario

(57) ABSTRACT

A three-wheeled vehicle having a reversed tricycle configuration provides a means of transporting a quadraped pet, such as a dog, to accompany the pet owner while he or she jogs or runs behind the vehicle pushing and steering it.

14 Claims, 2 Drawing Sheets

PET JOGGER

CROSS REFERENCE TO RELATED APPLICATION

This application is a continuation-in-part of application Ser. No. 11/027,537, filed Dec. 30, 2004 now abandoned.

BACKGROUND OF THE INVENTION

The present invention relates to a three-wheeled vehicle in which a dog or other quadruped pet can be transported while the pet owner is jogging or running behind the vehicle. This invention enables an individual who enjoys jogging and/or running with their pet to have their pet accompany them when the pet is not able or disposed to do so.

Three-wheeled strollers designed for carrying an infant while an adult is jogging or running have long been known in the prior art. A typical example of such a "baby jogger" is taught by Jacobs, U.S. Pat. No. 5,029,891. The baby jogger vehicle has a tricycle-type wheel configuration, with one wheel in the front and two wheels in the rear. A seat to accommodate an infant in the upright seated position is positioned above the rear wheels. A handle for pushing and guiding the vehicle extends from the portion of the vehicle supported by the two rear wheels.

The principal problem encountered in adapting such a "baby jogger" for pets is the fact that dogs and other quadrupeds do not sit the same way humans do. In the upright seated position, humans lean back with their legs dangling in front of them. Dogs and most other quadruped animals, on the other hand, sit leaning forward on their front legs. Therefore, a pet jogger should be designed for load distribution toward the front of the vehicle, as opposed to the baby jogger which distributes the load to the rear.

For optimal stability of a three-wheeled vehicle, the load should be concentrated above the wider wheel base afforded by the two wheels with a connecting axle. Applying this principle to a pet jogger with forward load distribution, it follows that the optimal design is not the standard tricycle configuration, but rather a reversed tricycle configuration, with two wheels in the front and one in the rear.

One version of a three-wheeled vehicle primarily designed for transporting aged, infirm or disabled pets is taught by Gordon, U.S. Pat. No. 6,913,271. But Gordon ignores the different load distribution of a pet vehicle and retains the standard tricycle configuration of a baby jogger. Furthermore, the Gordon design is not adaptable to jogging or running on rugged terrain, since the platform on which the pet sits is supported directly on the axles of the front and rear wheels, thus limiting ground clearance height to the radius of the wheels. In the Gordon "Pet Buggy," moreover, the shock of passing over curbing or other irregularities in the vehicle's path is imparted directly to the platform on which the pet sits, without any cushioning or shock-absorbing mechanism.

Consequently, the Gordon "Pet Buggy" does not address the need for a stable vehicle in which a pet can comfortably sit while its owner jogs or runs. This is precisely the need that the present invention is designed to address.

SUMMARY OF THE INVENTION

The present invention addresses the need for a three-wheeled vehicle designed to transport a pet over a variety of terrains with a human jogger/runner pushing and steering the vehicle from the rear.

It is an object of the present invention to provide a three-wheeled pet vehicle with a reversed tricycle configuration so that the forward load distribution of a sitting quadruped is stably borne by the vehicle's wider two-wheel base.

It is another object of the present invention to provide a three-wheeled pet vehicle with wheel diameter and ground clearance sufficient to enable a smooth ride on a variety of terrains.

It is a further object of the present invention to provide a two-wheeled pet vehicle with shock absorbers to soften the shock of encountering irregularities in the vehicle's path and thereby avoid agitating the pet.

It is yet another object of the present invention to provide a two-wheeled pet vehicle having a steering assembly connected to the two front wheels to optimize handling and control in the reversed tricycle configuration.

It is yet a further object of the present invention to provide a two-wheeled pet vehicle with bicycle-type wheel braking mechanisms for increased safety, particularly when stopping the vehicle on steep downhill grades.

It is still another object of the present invention to provide a means of restraining the pet within a seat enclosure to prevent the pet from jumping out of the vehicle.

It is still a further object of the present invention to provide one or more support bars to enable the pet to prop itself up on its front paws and thus assume a semi-standing posture.

The foregoing and other beneficial and useful objects are achieved by a three-wheeled vehicle for transporting a quadruped pet, such as a dog, while the pet owner is jogging or running and pushing the vehicle from behind. The vehicle comprises three wheels, an undercarriage, a pet enclosure, and a steering assembly.

The three wheels are arranged in a reversed tricycle configuration, that is, with two front wheels in the forward part of the vehicle and one rear wheel in the back of the vehicle. The two front wheels are rotatably attached on either end of a front wheel axle, while the rear wheel is rotatably attached to a shorter rear wheel axle. All three wheels are of the type typically found on bicycle, with metal spokes supporting rim-mounted air-inflated tires. All three wheels have the same diameter, preferably sixteen inches (16"), large enough to allow a relatively smooth ride on rugged terrain.

The undercarriage comprises two forward uprights, a carriage frame and a rear wheel fork. The two forward uprights are erect tubular members, fabricated of durable plastic or metal, which are attached to the front wheel axle just inside the front wheels. The forward uprights slant obliquely upward from the front wheel axle at an acute angle of about 70° to the horizontal plane. At the bottom of each forward upright, just above the point of attachment to the front wheel axle, is a shock-absorber, preferably a coiled steel spring shock-absorber of the type typically installed on mountain bikes.

The upper end of each forward upright is rigidly attached to the forward end of the carriage frame. The carriage frame is a truncated A-frame structure, fabricated of durable tubular plastic or metal. The carriage frame has an open end, a closed end and a mid-frame bar. The carriage-frame is rigidly attached to the forward uprights at the open end in the front of the vehicle and rigidly attached to the rear wheel fork at the closed end at the rear of the vehicle.

The rear wheel fork comprises two fork prongs that extend perpendicularly or at an obtuse angle downward from the closed end of the carriage frame and connects to either end of the rear wheel axle. At the bottom of each fork prong, just above the point of attachment to the rear wheel axle, is a shock-absorber, preferably a coiled steel spring shock-absorber of the type typically installed on mountain bikes.

The pet enclosure comprises a pet platform, a platform rod, a back panel, a panel rod, two enclosure uprights, and one or more support bars. The pet platform is a square, rectangular or trapezoidal sheet of flexible material, such as woven natural or synthetic fiber. The pet platform is tautly stretched between the mid-frame bar of the carriage frame and the platform rod, with the latter being a solid metal rod secured at either end to the forward uprights.

The back panel is a square, rectangular or trapezoidal sheet of the same flexible material as the pet platform. The back panel is tautly stretched between the mid-frame bar of the carriage frame and the panel rod. The panel rod is a solid metal rod secured at either end to the enclosure uprights, which are tubular metal or durable plastic attached at the bases to either end of the mid-frame bar.

Alternately, the pet platform and the back panel can be one integral sheet of flexible material stretched tautly between the platform rod and the panel rod and wrapping around the mid-frame bar of the carriage frame. Also alternately, the enclosure uprights can be rotatably attached to the mid-frame bar with a locking mechanism so to allow the back panel to be tilted forward or backward and locked in various positions to accommodate different sized pets.

Preferably, the back panel and/or the pet platform has a pet harness comprising one or more flexible straps designed to be attached to a pet and/or to a pet collar in order to restrict the pet's movement within the pet enclosure.

One or more support bars comprise arcuate tubular metal or durable plastic bars that are attached to the two forward uprights and wrap around the front of the vehicle. Preferably, the support bars extend around both sides of the pet platform and also extend back to meet or attach to the enclosure uprights, thereby forming a complete enclosure around all sides of the pet platform. Optionally, the support bars can be wrapped with the same flexible material used for the pet platform and the back panel.

The arch of each support bar extends several inches forward of the platform rod, thus allowing the pet to lean forward in a semi-upright posture rather than sitting continuously. If more than one support bar is used, the arch of the higher support bars extends further forward than the arch of the lower support bars, thus enabling the pet to progressively assume a more upright posture by ascending stepwise with its front paws from the lower to the higher support bars.

Preferably, a retractable cover, made of flexible impervious fabric, is attached to the enclosure uprights above the back panel. When opened, the retractable cover extends above the pet platform in order to protect the pet from the elements.

The steering assembly comprises a horizontal handle bar, two steering bars, and one or more hand brakes. The handle bar is tubular metal with two handles, one at each end. Attached to one of both of the handles are hand brakes of the type typically installed on bicycles. When the hand brake is squeezed, it pulls on a cable which extends along the steering bars to control caliper or disc brakes on both front wheels.

The steering bars extend from the handle bar to the mid-frame bar of the carriage frame, to which they are rotatably attached. From the mid-frame bar, the steering bars extend further to the front wheel axle, to which their distal ends are rigidly attached between the forward upright and the wheel on either end of the axle.

In this configuration, the steering assembly enables the jogger/runner to control the movements of the vehicle in all directions by pushing it forward, pulling it back, applying the brakes, and/or applying a turning torque to the handle bar. The connection of the handle bar to the front wheels through the two steering bars optimizes the handling of the vehicle by transmitting the turning torque directly to the front wheels, which control the direction of the vehicle's movement.

DETAILED DESCRIPTION OF THE PREFERRED EMBODIMENT

Figure 1:
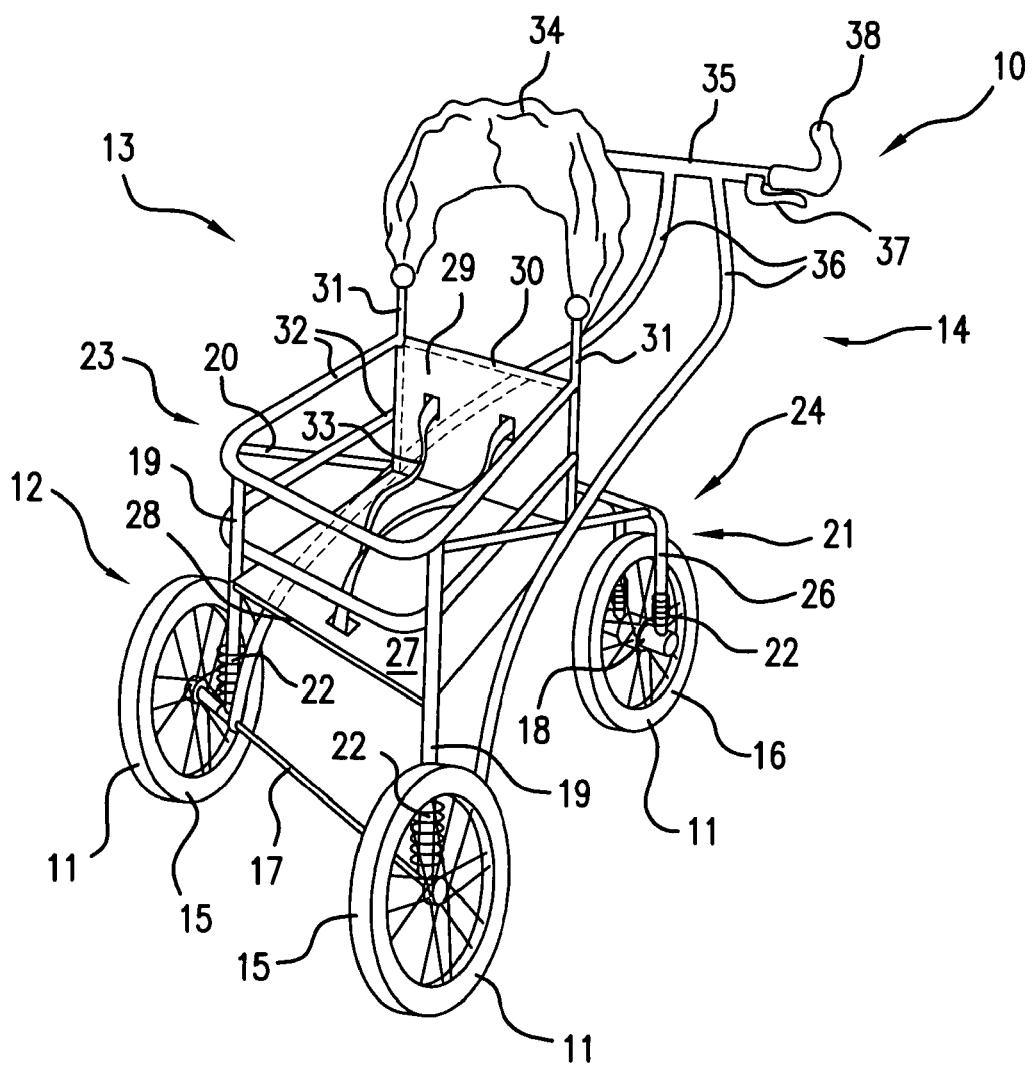
FIG. 1 is a front perspective view of the preferred embodiment of the present invention.

Referring to FIG. 1, the vehicle 10 comprises three wheels 11, an undercarriage 12, a pet enclosure 13, and a steering assembly 14. The three wheels 11 are arranged in a reversed tricycle configuration, that is, with two front wheels 15 in the forward part of the vehicle 10 and one rear wheel 16 in the back of the vehicle 10. The two front wheels 15 are rotatably attached on either end of a front wheel axle 17, while the rear wheel 16 is rotatably attached to a shorter rear wheel axle 18. All three wheels 11 are of the type typically found on bicycle, with metal spokes supporting rim-mounted air-inflated tires. All three wheels 11 have the same diameter, preferably sixteen inches (16"), large enough to allow a relatively smooth ride on rugged terrain.

Figure 2:
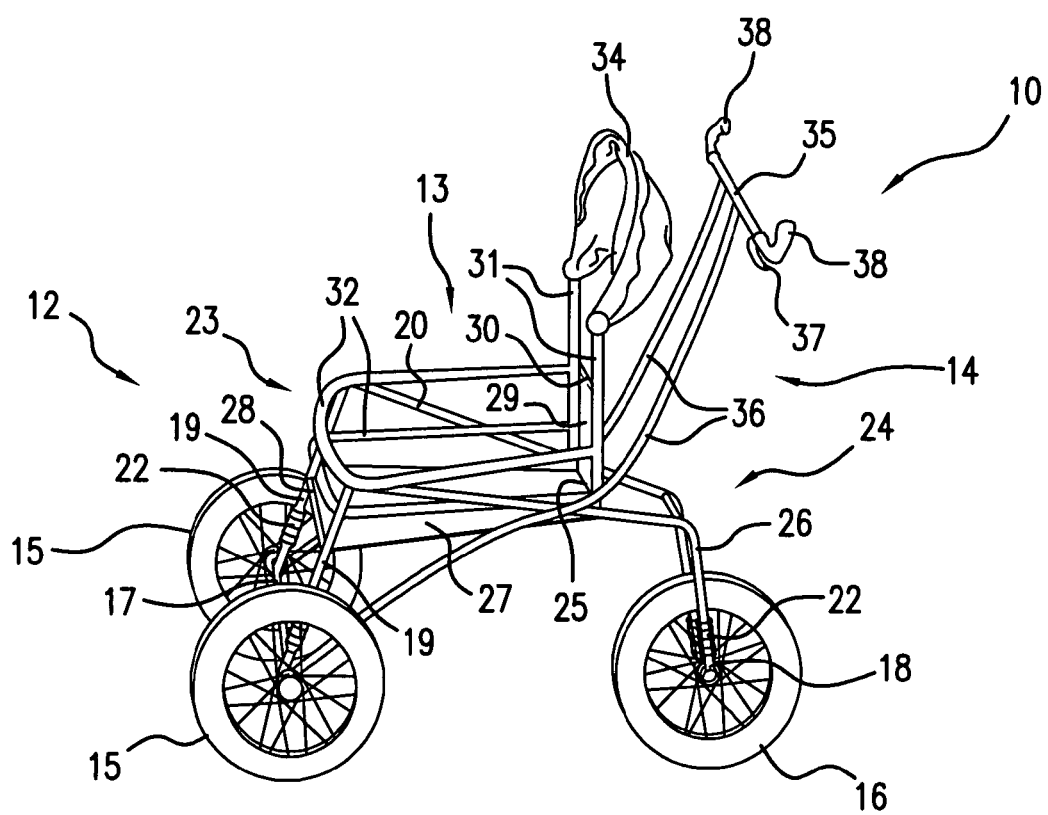
FIG. 2 is a side perspective view of the preferred embodiment of the present invention.

Referring to FIGS. 1 and 2, the undercarriage 12 comprises two forward uprights 19, a carriage frame 20 and a rear wheel fork 21. The two forward uprights 19 are erect tubular members, fabricated of durable plastic or metal, which are attached to the front wheel axle 17 just inside the front wheels 15. The forward uprights 19 slant obliquely upward from the front wheel axle 17 at an acute angle of approximately 70° to the horizontal plane. At the bottom of each forward upright 19, just above the point of attachment to the front wheel axle 17, is a shock-absorber 22, preferably a coiled steel spring shock-absorber of the type typically installed on mountain bikes.

The upper end of each forward upright 19 is rigidly attached to the forward end of the carriage frame 20. The carriage frame 20 is a truncated A-frame structure, fabricated of durable tubular plastic or metal. The carriage frame 20 has an open end 23, a closed end 24 and a mid-frame bar 25. The carriage-frame 20 is rigidly attached to the forward uprights 19 at the open end 23 in the front of the vehicle and rigidly attached to the rear wheel fork 21 at the closed end 24 at the rear of the vehicle.

The rear wheel fork 21 comprises two fork prongs 26 that extend perpendicularly or at an obtuse angle downward from the closed 24 end of the carriage frame 20 and connects to either end of the rear wheel axle 18. At the bottom of each fork prong 26, just above the point of attachment to the rear wheel axle 18, is a shock-absorber 22, preferably a coiled steel spring shock-absorber of the type typically installed on mountain bikes.

The pet enclosure 13 comprises a pet platform 27, a platform rod 28, a back panel 29, a panel rod 30, two enclosure uprights 31, and one or more support bars 32. The pet platform 27 is a square, rectangular or trapezoidal sheet of flexible material, such as woven natural or synthetic fiber.

The pet platform 27 is tautly stretched between the mid-frame bar 25 of the carriage frame 20 and the platform rod 28, with the latter being a solid metal rod secured at either end to the forward uprights 19.

The back panel 29 is a square, rectangular or trapezoidal sheet of the same flexible material as the pet platform 27. The back panel 29 is tautly stretched between the mid-frame bar 25 of the carriage frame 20 and the panel rod 30. The panel rod 30 is a solid metal rod secured at either end to the enclosure uprights 31, which are tubular metal or durable plastic attached at the bases to either end of the mid-frame bar 25.

Alternately, the pet platform 27 and the back panel 29 can be one integral sheet of flexible material stretched tautly between the platform rod 28 and the panel rod 30 and wrapping around the mid-frame bar 25 of the carriage frame 20. Also alternately, the enclosure uprights 31 can be rotably attached to the mid-frame bar 25 with a locking mechanism (not shown) so to allow the back panel 29 to be tilted forward or backward and locked in various positions to accommodate different sized pets.

Preferably, the back panel 29 and/or the pet platform 27 have a pet harness 33 comprising one or more flexible straps designed to be attached to a pet and/or to a pet collar in order to restrict the pet's movement within the pet enclosure 13.

One or more support bars 32 comprise arcuate tubular metal or durable plastic bars that are attached to the two forward uprights 19 and wrap around the front of the vehicle 10. Preferably, the support bars 32 extend around both sides of the pet platform 27 and also extend back to meet or attach to the enclosure uprights 31, thereby forming a complete enclosure around all sides of the pet platform 27. Optionally, the support bars 32 can be wrapped with the same flexible material used for the pet platform 27 and the back panel 29.

The arch of each support bar 32 extends several inches forward of the platform rod 28, thus allowing the pet to lean forward in a semi-upright posture rather than sitting continuously. If more than one support bar 32 is used, the arch of the higher support bars 32 extends further forward than the arch of the lower support bars 32, thus enabling the pet to progressively assume a more upright posture by ascending stepwise with its front paws from the lower to the higher support bars 32.

Preferably, a retractable cover 34, made of flexible impervious fabric, is attached to the enclosure uprights 31 above the back panel 29. When opened, the retractable cover 34 extends above the pet platform 27 in order to protect the pet from the elements.

The steering assembly 14 comprises a horizontal handle bar 35, two steering bars 36, and one or more hand brakes 37. The handle bar 35 is tubular metal with two handles 38, one at each end. Attached to one or both of the handles 38 are hand brakes 37 of the type typically installed on bicycles. When the hand brake 37 is squeezed, it pulls on a cable (not shown) which extends along the steering bars 36 to control caliper or disc brakes (not shown) on both front wheels 15.

The steering bars 36 extend from the handle bar 35 to the mid-frame bar 25 of the carriage frame 20, to which they are rotatably attached. From the mid-frame bar 25, the steering bars 26 extend further to the front wheel axle 17, to which their distal ends are rigidly attached between the forward upright 19 and the front wheel 15 on either end of the front wheel axle 17.

In this configuration, the steering assembly 14 enables the jogger/runner to control the movements of the vehicle 10 in all directions by pushing it forward, pulling it back, applying the brakes 37, and/or applying a turning torque to the handle bar 35. The connection of the handle bar 35 to the front wheels 15 through the two steering bars 36 optimizes the handling of the vehicle 10 by transmitting the turning torque directly to the front wheels 15, which control the direction of the vehicle's movement.

While this invention has been described with reference to a specific embodiment, the description is not to be construed in a limiting sense. Various modifications of the disclosed embodiment, as well other embodiments of the invention, will be apparent to persons skilled in the art upon reference to this description. It is therefore contemplated that the appended claims will cover any such modifications, or embodiments that fall within the true scope of this invention.

What is claimed is:

1. A pet vehicle comprising:
   (a) an undercarriage comprising two forward uprights, a rear wheel fork, and a carriage frame having an open end, a closed end and a mid-frame bar, with the two forward uprights being rigidly attached to the open end of the carriage frame and extending obliquely downward from the open end of the carriage frame, such that the lower ends of the forward uprights attach to the front wheel axle and are slightly offset from either end of front wheel axle, and such that the lower ends of the forward uprights are at an acute angle of approximately 70° to the horizontal plane;
   (b) two front wheels, which are rotatably attached to either end of the front wheel axle;
   (c) one rear wheel, which is rotatably attached to a rear wheel axle, with either end of the rear wheel axle being attached to two fork prongs comprising the rear wheel fork, and with the rear wheel fork being rigidly attached to the closed end of the carriage frame, such that the rear wheel fork extends downward from the closed end of the carriage frame at an obtuse angle not greater than 130°;
   (d) a pet enclosure comprising a pet platform, a platform rod, a back panel, a panel rod, and two enclosure uprights, with the pet platform being a sheet of flexible material tautly stretched between the mid-frame bar of the carriage frame and the platform rod, which platform rod is secured at either end to the forward uprights, and with the back panel being a sheet of flexible material tautly stretched between the mid-frame bar and the panel rod, which panel rod is secured at either end to the enclosure uprights, which enclosure uprights extend upward from either end of the mid-frame bar; and
   (e) a steering assembly comprising a handle bar, two steering bars, and one or more handbrakes, such that at either end of the handle bar are two handles, with a hand brake attached to one or both handles, and such that the steering bars extend from the handle bar to the mid-frame bar of the carriage frame, to which they are rotably attached, and thence to the front wheel axle, to which the distal ends of the steering bars are rigidly attached between the respective attachment points of the forward upright and the front wheel on either end of the front wheel axle.

2. The pet vehicle according to claim 1, wherein at the lower ends of the forward uprights, immediately above the point of attachment to the front wheel axle, is a shock-absorber, containing one or more coiled steel springs.

3. The pet vehicle according to claim 2, wherein at the lower end of each fork prong, immediately above the point of attachment to the rear wheel axle, is a shock-absorber containing one or more coiled steel springs.

4. The pet vehicle according to either of claims 2 or 3, wherein the pet enclosure further comprises a pet harness consisting of one or more flexible straps that are attached to a pet and/or a pet collar so as to contain and restrain the pet's movement within the pet enclosure.

5. The pet vehicle according to either of claims 2 or 3, wherein the pet enclosure further comprises one or more support bars that are attached to the two forward uprights and extend around the open end of the carriage frame.

6. The pet vehicle according to claim 5, wherein the support bar(s) extend(s) around both sides of the pet platform to the enclosure uprights.

7. The pet vehicle according to claim 4, wherein the pet enclosure further comprises one or more support bars that are attached to the two forward uprights and extend around the open end of the carriage frame.

8. The pet vehicle according to claim 7, wherein the support bar(s) extend(s) around both sides of the pet platform to the enclosure uprights.

9. The pet vehicle according to either of claims 2 or 3, wherein the pet enclosure further comprises a retractable cover, made of flexible impervious material, which is attached to the enclosure uprights above the back panel, and which, when opened, extends above the pet platform, thereby protecting the pet from the elements.

10. The pet vehicle according to claim 4, wherein the pet enclosure further comprises a retractable cover, made of flexible impervious material, which is attached to the enclosure uprights above the back panel, and which, when opened, extends above the pet platform, thereby protecting the pet from the elements.

11. The pet vehicle according to claim 5, wherein the pet enclosure further comprises a retractable cover, made of flexible impervious material, which is attached to the enclosure uprights above the back panel, and which, when opened, extends above the pet platform, thereby protecting the pet from the elements.

12. The pet vehicle according to claim 6, wherein the pet enclosure further comprises a retractable cover, made of flexible impervious material, which is attached to the enclosure uprights above the back panel, and which, when opened, extends above the pet platform, thereby protecting the pet from the elements.

13. The pet vehicle according to claim 7, wherein the pet enclosure further comprises a retractable cover, made of flexible impervious material, which is attached to the enclosure uprights above the back panel, and which, when opened, extends above the pet platform, thereby protecting the pet from the elements.

14. The pet vehicle according to claim 8, wherein the pet enclosure further comprises a retractable cover, made of flexible impervious material, which is attached to the enclosure uprights above the back panel, and which, when opened, extends above the pet platform, thereby protecting the pet from the elements.

* * * * *